US011546272B2

(12) United States Patent
Bandic et al.

(10) Patent No.: US 11,546,272 B2
(45) Date of Patent: Jan. 3, 2023

(54) FABRIC INTERCONNECTION FOR MEMORY BANKS BASED ON NETWORK-ON-CHIP METHODOLOGY

(71) Applicant: Western Digital Technologies, Inc., San Jose, CA (US)

(72) Inventors: Zvonimir Z. Bandic, San Jose, CA (US); Luis Cargnini, San Jose, CA (US); Dejan Vucinic, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/486,528

(22) Filed: Sep. 27, 2021

(65) Prior Publication Data
US 2022/0014480 A1 Jan. 13, 2022

Related U.S. Application Data

(63) Continuation of application No. 14/922,547, filed on Oct. 26, 2015, now Pat. No. 11,165,717.

(51) Int. Cl.
*G06F 13/18* (2006.01)
*H04L 49/109* (2022.01)
(Continued)

(52) U.S. Cl.
CPC .......... *H04L 49/109* (2013.01); *G06F 3/0604* (2013.01); *G06F 3/067* (2013.01);
(Continued)

(58) Field of Classification Search
CPC ... H04L 49/109; G06F 3/0604; G06F 3/0647; G06F 3/067
See application file for complete search history.

(56) References Cited

U.S. PATENT DOCUMENTS 6,968,394 B1 * 11/2005 El-Rafie .............. H04L 69/161
709/250
7,772,880 B2 8/2010 Solomon
(Continued)

FOREIGN PATENT DOCUMENTS

| CN | 102823214 A | 12/2012 |
|----|-------------|---------|
| JP | 2015035117 | 2/2015 |
| KR | 101028806 | 4/2011 |

OTHER PUBLICATIONS

Bandic, et al., Office Action dated Mar. 8, 2018 for U.S. Appl. No. 14/924,670.
(Continued)

*Primary Examiner* — Chris Parry
*Assistant Examiner* — Dixon F Dabipi
(74) *Attorney, Agent, or Firm* — Vierra Magen Marcus LLP

(57) ABSTRACT

Embodiments disclosed herein generally relate to the use of Network-on-Chip architecture for solid state memory structures which provide for the access of memory storage blocks via a router. As such, data may be sent to and/or from the memory storage blocks as data packets on the chip. The Network-on-Chip architecture may further be utilized to interconnect unlimited numbers of memory cell matrices, spread on a die, thus allowing for reduced latencies among matrices, selective power control, unlimited memory density growth without major latency penalties, and reduced parasitic capacitance and resistance. Other benefits may include improved signal integrity, larger die areas available to implement memory arrays, and higher frequency of operation.

20 Claims, 5 Drawing Sheets

(51) Int. Cl.
*H04L 45/74* (2022.01)
*H04L 45/00* (2022.01)
*G06F 3/06* (2006.01)

(52) U.S. Cl.
CPC ............ *G06F 3/0647* (2013.01); *H04L 45/22* (2013.01); *H04L 45/74* (2013.01)

(56) References Cited

U.S. PATENT DOCUMENTS

| | | | |
|---|---|---|---|
| 7,978,693 | B2 | 7/2011 | Dielissen |
| 8,386,690 | B2 | 2/2013 | Li et al. |
| 8,391,281 | B2 * | 3/2013 | Paul .................. H04L 45/60 370/413 |
| 8,442,057 | B2 * | 5/2013 | Howe ............... H04W 72/1242 370/413 |
| 8,443,144 | B2 | 5/2013 | Yim et al. |
| 8,719,753 | B1 | 5/2014 | Chow et al. |
| 8,819,616 | B2 | 8/2014 | Philip et al. |
| 9,443,561 | B1 | 9/2016 | Roberts et al. |
| 9,652,425 | B2 | 5/2017 | Chen et al. |
| 9,658,676 | B1 | 5/2017 | Witek et al. |
| 9,699,079 | B2 * | 7/2017 | Chopra .................. H04L 45/74 |
| 2002/0184419 | A1 * | 12/2002 | Creedon .................. G06F 30/30 710/100 |
| 2003/0075797 | A1 | 4/2003 | Suzuki et al. |
| 2004/0100832 | A1 | 5/2004 | Nakajima |
| 2008/0005402 | A1 | 1/2008 | Kim et al. |
| 2008/0084893 | A1 | 4/2008 | Lee |
| 2009/0210616 | A1 | 8/2009 | Karamcheti et al. |
| 2010/0061470 | A1 | 3/2010 | Wei et al. |
| 2011/0235531 | A1 * | 9/2011 | Vangal .................. H04L 49/109 370/252 |
| 2011/0320719 | A1 * | 12/2011 | Mejdrich ............... G06T 15/005 711/120 |
| 2012/0159496 | A1 | 6/2012 | Dighe et al. |
| 2013/0028090 | A1 | 1/2013 | Yamaguchi et al. |
| 2013/0031330 | A1 * | 1/2013 | Jones .................... G06F 13/385 711/206 |
| 2013/0083794 | A1 * | 4/2013 | Lakshmanamurthy ...................... H04L 12/28 370/428 |
| 2013/0188536 | A1 * | 7/2013 | Pirskanen .................. H04L 5/14 370/281 |
| 2013/0285739 | A1 | 10/2013 | Blaquiere |
| 2014/0156929 | A1 | 6/2014 | Falsafi et al. |
| 2014/0204735 | A1 | 7/2014 | Kumar et al. |
| 2014/0310467 | A1 | 10/2014 | Shalf et al. |
| 2014/0328208 | A1 | 11/2014 | Norige et al. |
| 2014/0376569 | A1 * | 12/2014 | Philip ....................... G06F 1/12 370/503 |
| 2015/0016172 | A1 | 1/2015 | Loh et al. |
| 2015/0109024 | A1 | 4/2015 | Abdelfattah et al. |
| 2015/0178435 | A1 * | 6/2015 | Kumar .................. G06F 30/327 716/114 |
| 2015/0220470 | A1 | 8/2015 | Chen et al. |
| 2016/0182396 | A1 | 6/2016 | Kaul et al. |
| 2016/0284046 | A1 | 9/2016 | Koker et al. |
| 2016/0344629 | A1 | 11/2016 | Gray |
| 2017/0118111 | A1 | 4/2017 | Bandic et al. |
| 2017/0118139 | A1 | 4/2017 | Bandic et al. |
| 2017/0272381 | A1 * | 9/2017 | Li ......................... H04L 49/109 |

OTHER PUBLICATIONS

Bandic, et al., Office Action dated May 26, 2017 for U.S. Appl. No. 14/924,670.
Srinivasan, et al., A Memory Subsystem Model for Evaluating Network-on-Chip Performance, https://www.designreuse.com/articles/25029/memory-subsystem-model-noc-performance.html, accessed on May 31, 2018.
Bandic, et al., Notice of Allowance dated Nov. 2, 2018 for U.S. Appl. No. 14/924,670.
Office Action received for CN Patent Application No. 201610970031.9, dated Jun. 8, 2020, 30 pages.
Non-Final Office Action dated Jul. 14, 2017, U.S. Appl. No. 14/922,547, filed Oct. 26, 2015.
Response to Office Action dated Jan. 16, 2018, U.S. Appl. No. 14/922,547, filed Oct. 26, 2015.
Final Office Action dated May 16, 2018, U.S. Appl. No. 14/922,547, filed Oct. 26, 2015.
Response to Office Action dated Oct. 16, 2018, U.S. Appl. No. 14/922,547, filed Oct. 26, 2015.
Non-Final Office Action dated Jan. 28, 2019, U.S. Appl. No. 14/922,547, filed Oct. 26, 2015.
Response to Office Action dated Jun. 26, 2019, U.S. Appl. No. 14/922,547, filed Oct. 26, 2015.
Final Office Action dated Oct. 18, 2019, U.S. Appl. No. 14/922,547, filed Oct. 26, 2015.
Response to Office Action dated Apr. 3, 2020, U.S. Appl. No. 14/922,547, filed Oct. 26, 2015.
Non-Final Office Action dated Oct. 5, 2020, U.S. Appl. No. 14/922,547, filed Oct. 26, 2015.
Response to Office Action dated Dec. 22, 2020, U.S. Appl. No. 14/922,547, filed Oct. 26, 2015.
Final Office Action dated Apr. 19, 2021, U.S. Appl. No. 14/922,547, filed Oct. 26, 2015.
Notice of Allowance dated Jul. 8, 2021, U.S. Appl. No. 14/922,547, filed Oct. 26, 2015.
Amendment under 37 CFR 1.312 dated Aug. 12, 2021, U.S. Appl. No. 14/922,547, filed Oct. 26, 2015.

* cited by examiner

FABRIC INTERCONNECTION FOR MEMORY BANKS BASED ON NETWORK-ON-CHIP METHODOLOGY

CLAIM OF PRIORITY

This application is a continuation application of U.S. patent application Ser. No. 14/922,547 filed Oct. 26, 2015, entitled, "FABRIC INTERCONNECTION FOR MEMORY BANKS BASED ON NETWORK-ON-CHIP METHODOLOGY," published as US2017/0118139 on Apr. 27, 2017 and issued as U.S. Pat. No. 11,165,717 on Nov. 2, 2021 by Bandic et al., incorporated by reference herein in its entirety.

BACKGROUND

Field

Embodiments disclosed herein generally relate to data storage systems, and more particularly, to a memory device utilizing Network-on-Chip architecture for the interconnection of memory banks.

Description of the Related Art

The heart of a computer is a magnetic recording device which typically may include a rotating magnetic media or a solid state media device. A number of different memory technologies exist today for storing information for use in a computing system.

In recent years there has been a demand for higher density devices, which maintain a relatively low cost per bit, for use in high capacity storage applications. Today the memory technologies that generally dominate the computing industry are DRAM and NAND flash; however these memory technologies may not be able to address the current and future capacity demands of next generation computing systems.

Existing non-volatile memory bank architecture employs a classic fabric routing methodology which has been widely adopted in SRAM, DRAM, FLASH, MRAM, PCM, and ReRAM, as well as with HMC memory banks. This classic methodology limits the amount of memory cells that may be included in a single die as well as the amount of bandwidth and access points to the same memory bank.

Traditionally, memory banks are architectured and organized as banks comprising arrays of subbanks. Each subbank may comprise multiple MATs. Each MAT may be composed of four or more subarrays and predecoding logic. As such, H-Tree routing may be used to route the I/O of the subarrays across the die vertically and horizontally. However, approximately 70% of the area is utilized to interconnect the subarrays; therefore the majority of the surface of the memory is logic interconnection and not memory. As such, the biggest limitation with existing memory bank architecture is the amount of wire necessary to route the entire memory. Excessive amount of wire is the main cause for latency in existing memory banks from SRAM to DRAM. Given the physical limitations of traditional memory banks, subarrays share wordlines to write and read. As such, each bank can only access one subarray at a given time. With such limitations, there may only be one physical access interface, due to complexity and cost, to implement additional interfaces.

Therefore, there is a need in art for an improved memory device which utilizes an improved architecture and allows for access to any given subarray in parallel. Furthermore, there is a need in the art for an improved methodology for routing memory banks without employing a majority of the die for routing.

SUMMARY

Embodiments disclosed herein generally relate to the use of Network-on-Chip architecture for solid state memory structures which provide for the access of memory storage blocks via a router. As such, data may be sent to and/or from the memory storage blocks as data packets on the chip. The Network-on-Chip architecture may further be utilized to interconnect unlimited numbers of memory cell matrices, spread on a die, thus allowing for reduced latencies among matrices, selective power control, unlimited memory density growth without major latency penalties, and reduced parasitic capacitance and resistance. Other benefits may include improved signal integrity, larger die areas available to implement memory arrays, and higher frequency of operation.

In one embodiment, a memory device is disclosed. The memory device may include a plurality of nodes. Each node may include a router, a plurality of links interconnecting each router with each plurality of nodes using Network-on-Chip architecture, and at least one memory array. The router may include a plurality of FIFOs, data packet switching logic, and at least one aggregator. Each FIFO may allow for the individual breaking of clock domains across multiple channels. The aggregator may be operatively connected with the data packet switching logic. The at least one memory array may be operatively connected with each router via a link. Each memory array may be accessed via the router.

In another embodiment, a memory device is disclosed. The memory device may include at least one interconnected memory cell matrix. The interconnected memory cell matrix may include a plurality of routers, a plurality of intellectual property cores, and at least one link. Each router may include a plurality of FIFOs. One intellectual property core may be coupled to each router. The at least one link may couple adjacent routers of the plurality of routers utilizing a Network-on-Chip architecture scheme.

In yet another embodiment, a memory device is disclosed. The memory device may include at least one interconnected memory cell matrix. The interconnected memory cell matrix may include a plurality of routers and a plurality of intellectual property cores. Each router may include a plurality of FIFOs, data packet switching logic, and at least one aggregator. The aggregator may be operatively connected to at least one FIFO and the data packet switching logic. One intellectual property core may be coupled to each router via a link utilizing a Network-on-Chip architecture scheme.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments in any field.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following disclosure, reference is made to embodiments. However, it should be understood that the disclosure is not limited to specific described embodiments. Instead, any combination of the following features and elements, whether related to different embodiments or not, is contemplated to implement and practice the claimed subject matter. Furthermore, although embodiments described herein may achieve advantages over other possible solutions and/or over the prior art, whether or not a particular advantage is achieved by a given embodiment is not limiting of the claimed subject matter. Thus, the following aspects, features, embodiments and advantages are merely illustrative and are not considered elements or limitations of the appended claims except where explicitly recited in a claim(s).

Embodiments disclosed herein generally relate to the use of Network-on-Chip architecture for solid state memory structures which provide for the access of memory storage blocks via a router. As such, data may be sent to and/or from the memory storage blocks as data packets on the chip. The Network-on-Chip architecture may further be utilized to interconnect unlimited numbers of memory cell matrices, spread on a die, thus allowing for reduced latencies among matrices, selective power control, unlimited memory density growth without major latency penalties, and reduced parasitic capacitance and resistance. Other benefits may include improved signal integrity, larger die areas available to implement memory arrays, and higher frequency of operation.

In the following description of aspects of the present disclosure, reference is made to the accompanying drawings that form a part hereof, and in which is shown by way of illustration of the specific implementations in which the disclosure may be practiced. It should be noted that the figures discussed herein are not drawn to scale and do not indicate actual or relative sizes. Any hatching in the figures is used to distinguish layers and does not represent the type of material used.

Figure 1A:
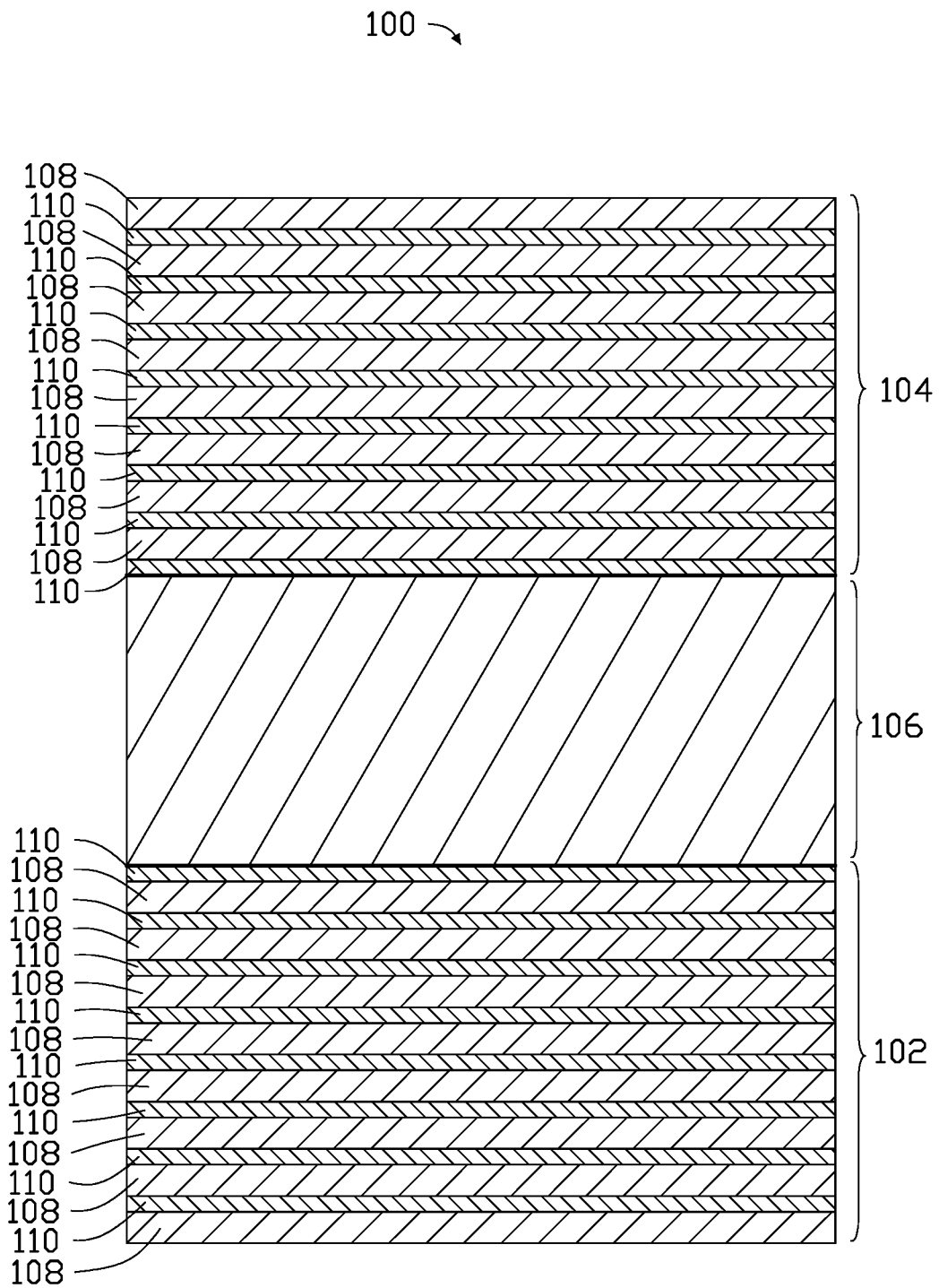
FIG. 1A illustrates architecture of a memory array of a conventional memory device.

FIG. 1A illustrates the architecture of conventional memory banks 102, 104 of a memory device 100 as known in the art. As shown, the memory device 100 may include a first memory bank 102 and a second memory bank 104 operatively connected by interface logic 106. In certain embodiments, the first memory bank 102 and/or the second memory bank may be a subbank. It is contemplated, however, that more memory banks may be utilized within the memory device 100, wherein each memory bank may be connected by interface logic. The first memory bank 102 and the second memory bank 104 may each comprise a plurality of subarrays 108. In certain embodiments, the first memory bank 102 and the second memory bank 104 may each comprise a plurality of subbanks (not shown). Each subarray 108 may be a subarray of memory cells. Interconnectors 110 may separate each subarray 108 within each of the first memory bank 102 and the second memory bank 104. The interconnectors 110 may be wires dedicated to the routing of the entire memory device 100. As shown, approximately about 60% of the area of each of the first memory bank 102 and the second memory bank 104 is dedicated to interconnectors 110.

A drawback of existing memory bank architecture, such as the architecture of the first memory bank 102 and the second memory bank 104 of FIG. 1A, is the amount of wire necessary to route the entire memory device 100. As such, a main cause of latency in existing memory banks, such as those of the first memory bank 102 and the second memory bank 104, is the amount of wire regardless of the type of device (for example, SRAM, DRAM, etc.). As such, a challenge exists in determining the tradeoff between power, area, and latency within such memory devices.

Figure 1B:
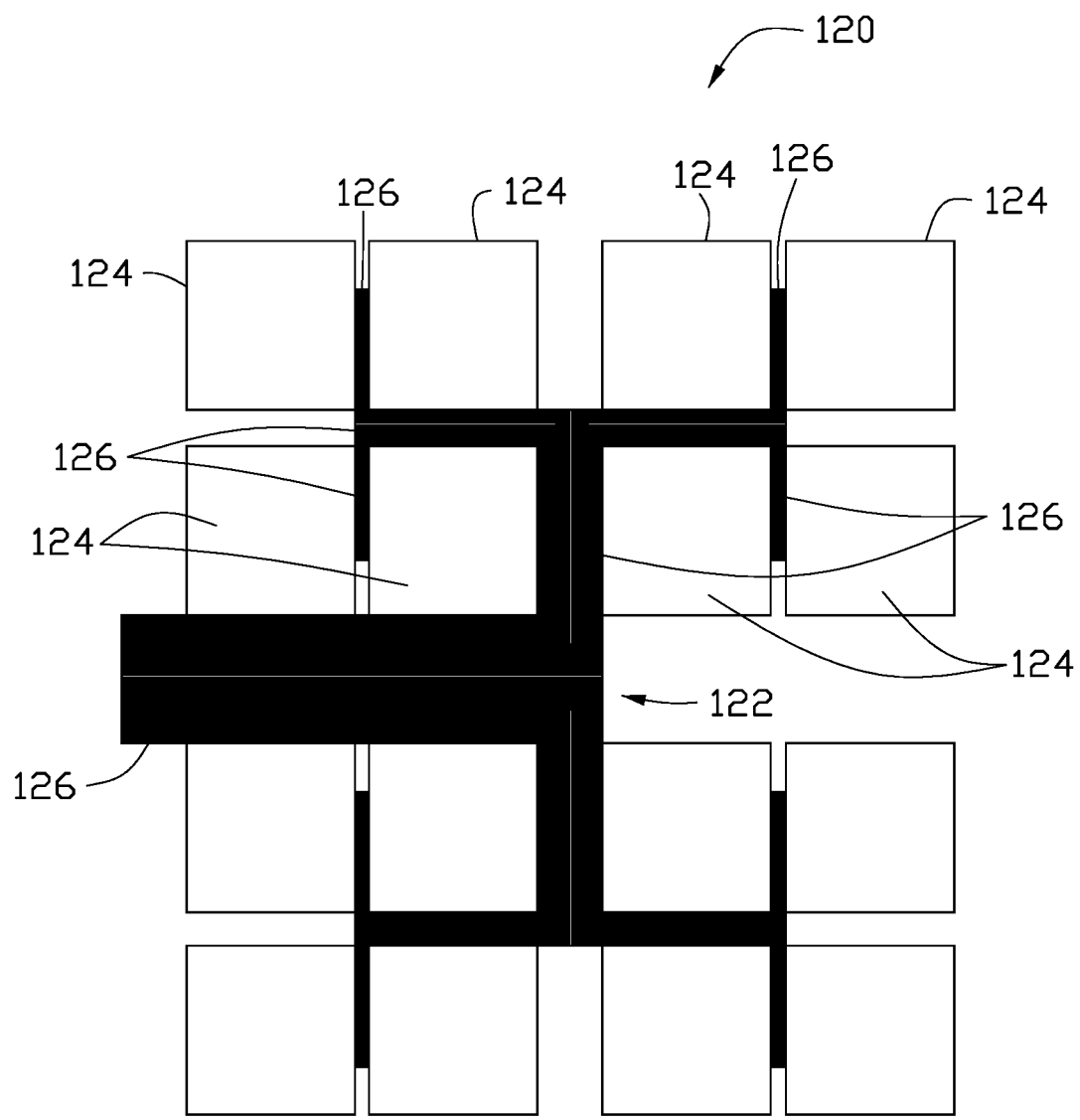
FIG. 1B illustrates an overview of memory bank architecture utilizing a conventional H-Tree technique.

FIG. 1B illustrates another embodiment of a conventional memory bank architecture scheme 120 utilizing an H-Tree routing layout 122. Conventional memory banks may include banks of memory (not shown), each bank being divided into arrays of subbanks (not shown). Each subbank may be further divided into multiple MATs (not shown), and each MAT may be composed of four or more subarrays 124. Each subarray 124 may include predecoding logic (not shown), 2-D memory array cells (not shown), row and column decoders (not shown), wordline drivers (not shown), bitline muxers (not shown), sense amplifiers (not shown), and/or output drivers (not shown). Each element of each subarray 124 may be interconnected with the I/O interface (not shown).

Each subarray 124 may be connected within the conventional memory bank architecture scheme 120 via wire 126. A conventional memory bank architecture scheme 120 utilizing a line size of eight words of 64 bits maintains a total of 512 bits, or metal tracks. As such, collectively, each conventional memory bank architecture scheme 120 may utilize over 8,000 wires 126 to interconnect each subarray 124 therewithin. The utilization of H-Tree routing layout 122 necessitates that power is constantly applied to the entire H-Tree.

The conventional memory bank 102, 104 of FIG. 1A may assume the H-Tree routing layout 122. As discussed, supra, the use of the H-Tree routing layout 122 may utilize between about 70% and 80% of the space of the memory device 100 is dedicated to routing wires 126 and I/O fabric interconnection.

Figure 2A:
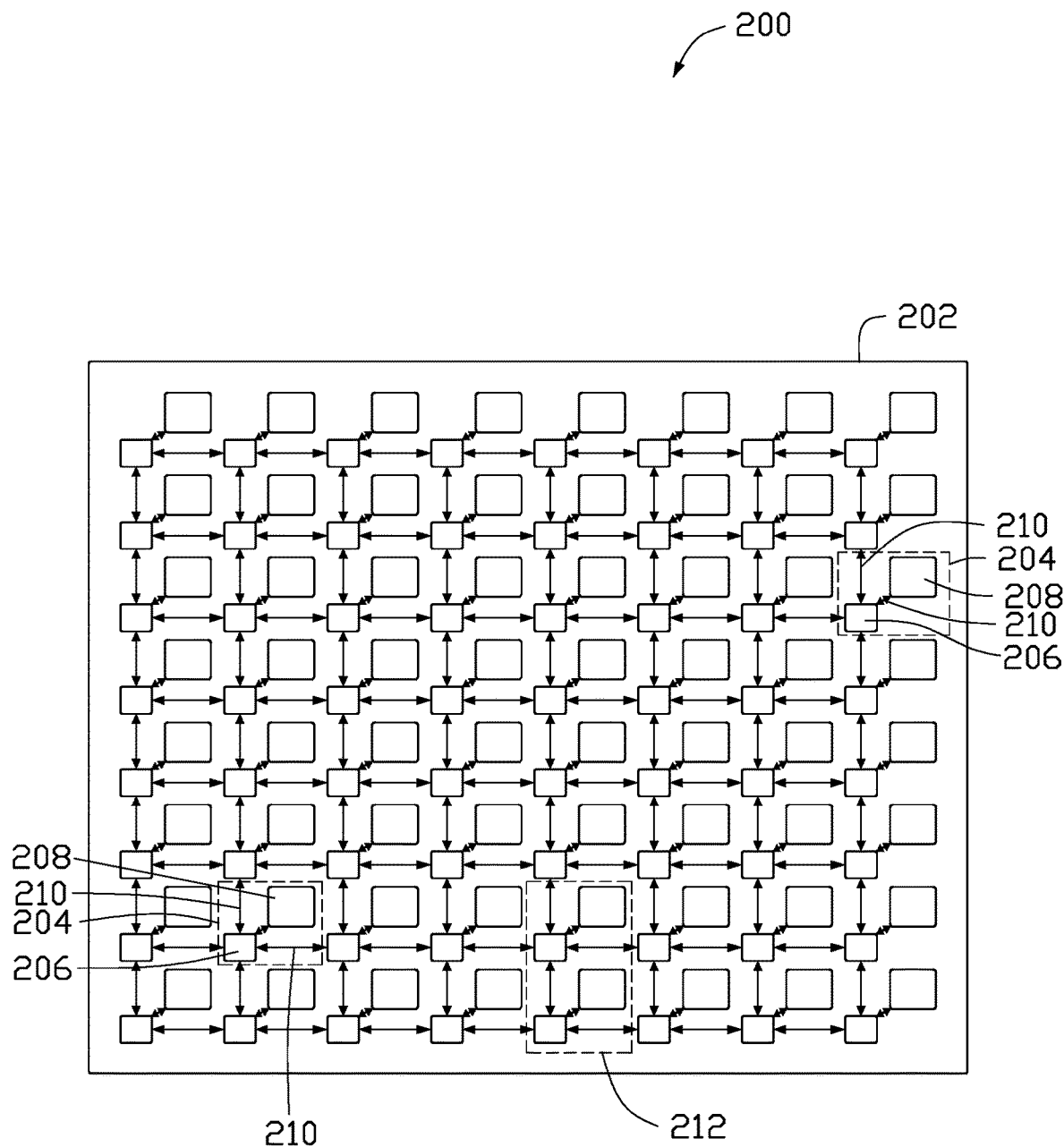
FIG. 2A illustrates a solid state memory structure utilizing Network-on-Chip architecture according to one embodiment described herein.

FIG. 2A illustrates an embodiment of a memory device 200 utilizing Network-on-Chip architecture 202 with a sparse mesh topography. In certain embodiments, the memory device 200 may be a solid state memory structure. The use of Network-on-Chip architecture 202 may allow for the interconnection of an unlimited number of nodes, spread on a die. The Network-on-Chip architecture 202 may be an interconnected memory cell matrix. As such, each node 204 may be an individual memory cell matrix. As shown in FIG. 2A the memory device 200 may include a plurality of nodes 204 wherein each node 204 includes at least one router 206 and at least one memory array 208. In certain embodiments, the memory device 200 may include a plurality of nodes 204 wherein each node 204 includes at least one router 206 and at least on subarray (not shown). Each memory array 208 may be an intellectual property core. Each memory array 208 may be accessed and/or reached through the respective router 206. Additionally, data may be sent to and/or from the memory array 208 as data packets on the chip. In certain embodiments, each node 204 may include a plurality of links 210. Each of the plurality of links 210 may interconnect each router 206 of each of the plurality of nodes 204 using the Network-on-Chip architecture 202. As such, the plurality of nodes 204 may be patterned in a grid pattern. Furthermore, each router 206 may be operatively connected with a respective memory array 208 via a link 210. The plurality of nodes 204, including the routers 206 and memory arrays 208 therewithin, may communicate among each other by routing messages over the routers 206 and plurality of links 210 of the sparse mesh.

In certain embodiments, a mesh topology for Network-on-Chip architecture 202 may support silicon implementation of the inherent 2-D structure of the topology which maps well to planar semiconducting processes. A traditional 2-D mesh topology may assume a regular and/or symmetric layout with uniformly sized nodes 204. It is contemplated, however, that nodes 204 and/or contents of the nodes 204 may vary widely in shape and/or in dimension.

To accommodate memory arrays 208 attached to a Network-on-Chip each router 206 may have a range of addresses, rather than a single address. As such, in some embodiments, each router 206 may have a unique address rather than X and/or Y coordinates. In certain embodiments, the unique address for each router 206 may be a range of addresses. The range of addresses for each router 206 may be a sequential range of addresses. Additionally, each memory array 208 may have a unique address and/or a unique range of addresses rather than X and/or Y coordinates. The range of addresses for each memory array 208 may be a sequential range of addresses, as each memory array 208 is a linear sequence of memory addresses.

As such, a data packet (not shown) may be sent to an address. Each router 206 may have a range of addresses which are defined by the amount of memory available in the node 204. As such, each node 204 may be, by way of example only, 1024 lines or 2048 lines, independently, in the same design. Therefore, the data packet switching logic 222 (See FIG. 2C) may match a row and column to a field of the data packet and send the data packet to a local port connected with a memory array 208. In certain embodiments, a calculation may be performed and the result compared to the properties of the node 204. If the addressing of the row is larger and/or smaller than the node 204 the data packet may be routed north and/or south. If the addressing of the column is larger and/or smaller than the node 204 the data packet may be routed east and/or west. As such, the topology may enforce the address routing mechanism on the network. The switching logic 222 may perform a calculation to verify that the data packet address is inside a range of the global space. If the data packet address is not within the range of the global space multiple different routing algorithms may be calculated on-the-fly to reroute the data packet. If a match of the address is subtracted from the base address, the address inside of the memory array range may be connected to the local port. If a match of the address is not subtracted from the base address, the data packet may be routed to another port. The decision of which port may depend on the topology of the memory device and a routing table. Additionally, the Network-on-Chip architecture may be built in any shape, without modifying or correcting the addressing logic.

Routers 206 may be located at grid points where data packets or message packets may change directions on an X-Y plane and/or exit to host blocks on the Network-on-Chip. As such, routers 206 may be utilized when data packets need to switch from one node 204 to another node 204 on the path of the data packet. A router 206 may be utilized at points where data packets from multiple input links may meet and contend for a common output link.

As further shown in FIG. 2A, each router 206 may be operatively connected to at least one adjacent router 206 via at least one link 210. The plurality of links 210 may interconnect each of the plurality of nodes 204 to form a first two-dimensional mesh, as illustrated by the pattern of the Network-on-Chip architecture 202 of FIG. 2A. In some embodiments, the Network-on-Chip architecture 202 may be two-dimensional. It is contemplated, however, that other the Network-on-Chip architecture 202 may have dimensions greater than two in certain embodiments. The plurality of links 210 may form a plurality of rows and/or a plurality of columns.

The memory device 200 may further include a first router mesh structure 212. The first router mesh structure 212 may include a plurality of routers 206, such as at least two routers 206, and a plurality of memory arrays 208, such as at least two memory arrays 208. Each memory array 208 may be operatively connected to at least one router 206 via a link 210. The first router mesh structure 212 may further include a plurality of nodes 204 having a layout disposed at a first layer. In certain embodiments, an interior portion of the first router mesh may include a standard tile that is tessellated in X and Y directions to form a plurality of N×N meshes. It is contemplated, however, that any tessellation or topology may be utilized to interconnect the nodes 204 in the mesh structure 212 and/or in the Network-on-Chip architecture 202.

As shown in FIG. 2A, approximately sixty-four nodes 204 are shown; however it is contemplated that any number of nodes 204 may be utilized in a memory device, such as memory device 200, utilizing Network-on-Chip architecture.

Figure 2B:
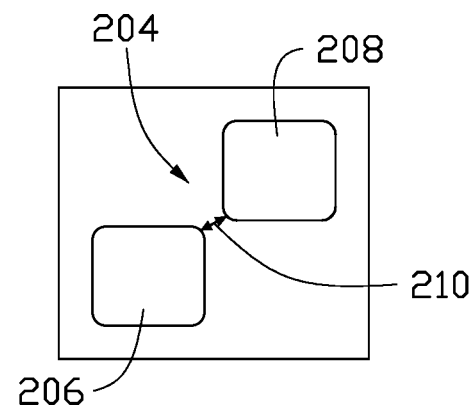
FIG. 2B illustrates an individual router operatively connected to a memory storage block according to one embodiment described herein.

FIG. 2B illustrates an individual node 204, as referenced with respect to FIG. 2A. The node 204 may be a memory cell matrix. As shown in FIG. 2B, the node 204 may include at least one router 206. In some embodiments, the node 204 may further include at least one memory array 208. The memory array 208 may be in an intellectual property core. At least one memory array 208 may be operatively connected with each router via a link 210. Furthermore, each memory array 208 may be accessed via the router 206. Each memory array 208 may be accessed in parallel. In certain embodiments each router 206 may be sequentially accessed across a path of a data packet without supplying power to the entire memory device.

Each node 204 of the plurality of nodes may be operated on a different frequency. Furthermore, in some embodiments, each node 204 of the plurality of nodes may be operated with a separate voltage. The separate voltage may be selected and/or generated on the fly.

Figure 2C:
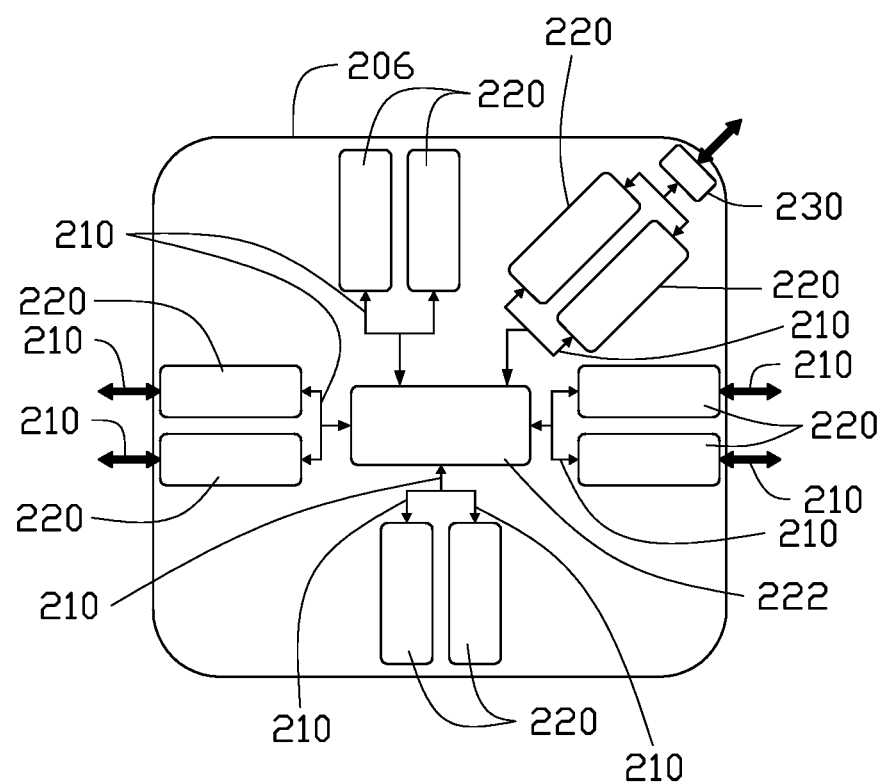
FIG. 2C illustrates a router according to one embodiment described herein.
Figure 2D:
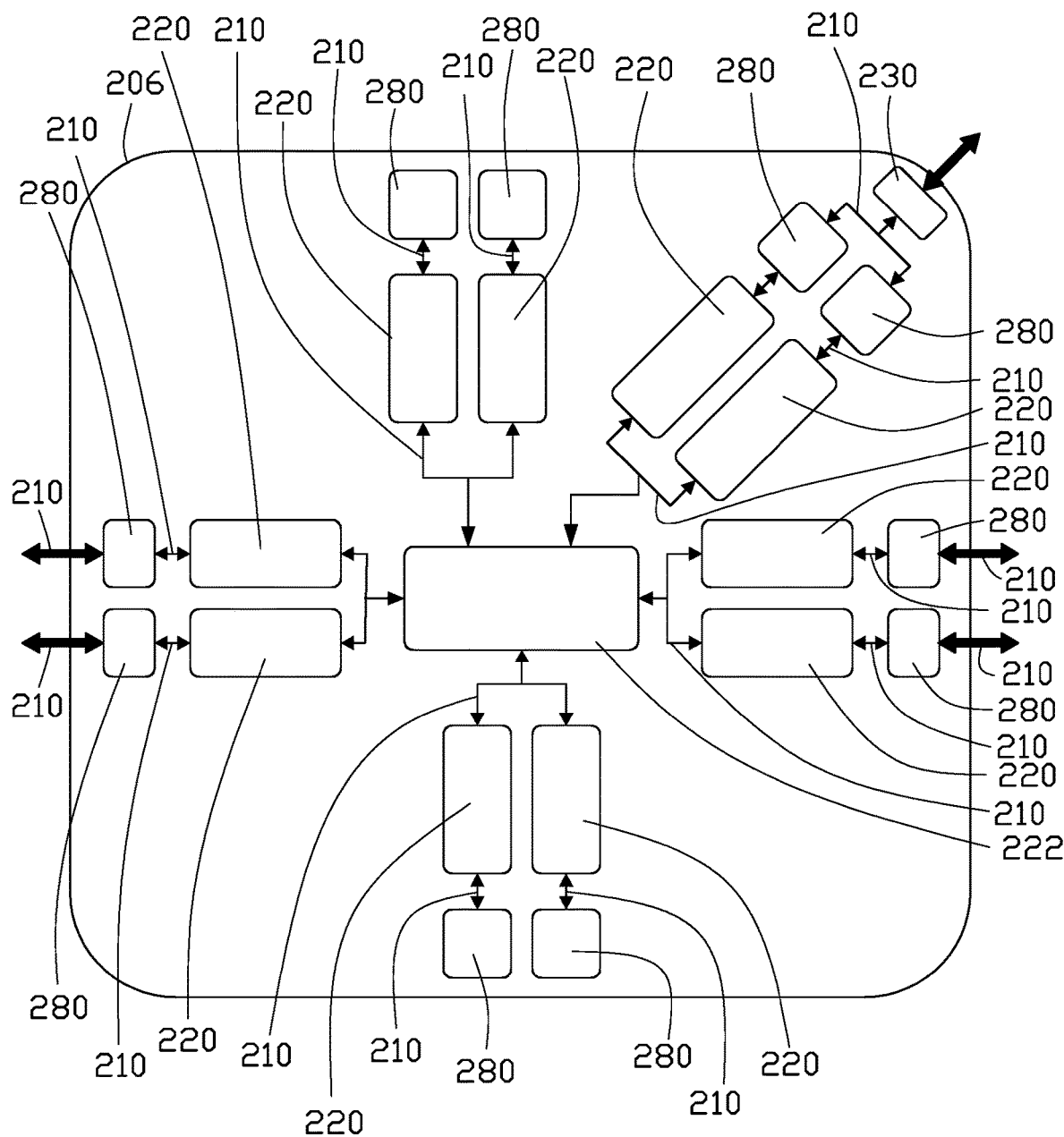

FIG. 2C illustrates an embodiment of the router 206. Each router 206 may include a plurality of first in-first out devices (FIFOs) 220. Each FIFO 220 may organize and/or manipulate a data buffer such that the first entry received is the processed first. In some embodiments the plurality of FIFOs 220 may be at least six FIFOs 220. In another embodiment, the plurality of FIFOs 220 may be ten FIFOs 220. It is contemplated however, that any number of FIFOs 220 may be utilized. Each FIFO 220 may be operatively connected to an adjoining FIFO 220 as a pair of FIFOs 220. In some embodiments, each router 206 may further include data packet switching logic 222. Each FIFO 220 may allow for the individual breaking of clock domains across multiple channels. Each channel may be operated at an independent operating frequency. Furthermore, each channel may be a full-duplex channel. Each channel may be operated on a different bandwidth.

The use of a FIFO 220 may allow for the breaking of clock domains one-by-one completely independently across various channels. As such, a full duplex channel may operate in different bandwidths and/or operating frequencies. Furthermore, each channel may operate in different and independent frequencies. The use of a FIFO 220 may allow for an EDA tool to route a Clock Tree Synthesis with improved performance and/or improved signal to noise ratio. Additionally, each FIFO 220 may be implemented with non-volatile and/or volatile technology, for example, SRAM and/or MRAM.

As further shown in FIG. 2C the router 206 may further include an aggregator 230. Although one aggregator 230 is shown, it is contemplated that any number of aggregators 230 may be utilized. The aggregator 230 may be connected to the data packet switching logic 222 via wire 210, or any other interconnection. The aggregator 230 may further be connected to at least one FIFO 220 via wire 210, such that the aggregator is between the data packet switching logic 222 and the at least one FIFO 220. In certain embodiments, the aggregator 230 may be connected to at least one FIFO 220 for accessing the memory array 208. As such, the aggregator 230 may be connected to the FIFOs 220 connected to the memory array 208. In certain embodiments, the aggregator 230 may be connected to some or all of the FIFOs 220 of the router 206. The aggregator 230 may translate from the Network-on-Chip architecture between the router 206 and the memory array 208. In certain embodiments, the aggregator 230 may concentrate multiple channels.

Data packets (not shown) may be fragmented, such that data may be sent to and from the memory array 208 via the router 206 and/or the plurality of links 210 as a fragmented data packet. For example, 64 bits may be broken into four packets of 16 bits or eight packets of eight bits. The same path need not be followed to send each data packet to its destination. As such, four clock cycles plus hops are needed to transit the data packet across the network to read or write the memory in any position. Furthermore, the amount of wires, as shown with reference to FIGS. 1A and 1B, is reduced with the use of Network-on-Chip architecture 202, as shown with reference to the memory device 200 of FIG. 2A. Due the low amount of wires across each node and the use of FIFOs 220, the memory device 200 may operate at increased frequencies as compared to the memory device shown in FIGS. 1A and 1B.

Additionally, operating at higher frequencies may also allow for the linear prediction of the total latency of any communication in a given system in a specific process node 204, prior to fabrication. Furthermore, the final power consumption of a memory device may be accurately predicted. Also, specific routers 206 may be activated sequentially across the path of a data packet as it travels across the network, without having to power the entire network.

Benefits of the present disclosure include reduced latencies among matrices, selective power control as the power source of unused clusters may be completely shut down while those power sources of clusters in use may receive power. Additional benefits include that the memory density may be indefinitely grown without latency penalties, limited by physical factors of the fabrication process and the die size. Further benefits include reduced parasitic capacitance and resistance, improved signal integrity, more die area available to implement memory arrays thus allowing for higher memory density, and higher frequency of operation. Also, multiple channels may be had in each direction thus adding to the concept of priority communication into the memory device. Additionally, each FIFO may be utilized with volatile and/or non-volatile technologies, such as, by way of example only, SRAM and/or MRAM.

While the foregoing is directed to embodiments of the disclosure, other and further embodiments may be devised without departing from the basic scope thereof, and the scope thereof is determined by the claims that follow.

What is claimed is:

1. A memory structure, comprising:
a plurality of nodes connected together by a plurality of links, each node comprising:
a memory array having a range of memory addresses, the ranges of memory addresses of memory arrays of the plurality of nodes forming a global address space; and
a router that is connected to the memory array and is powered independently of the memory array, the router configured to:
route first data packets to locations in the memory array connected to the router based on addresses of the first data packets being in a first range of memory addresses of the memory array;
route second data packets to other nodes of the plurality of nodes based on addresses of the second data packets being in respective second ranges of memory arrays of the other nodes;
wherein the memory arrays of the plurality of nodes are selectively powered for use, the memory structure is configured to communicate a data packet through two or more nodes of the plurality of nodes by powering routers of the two or more nodes without powering memory arrays of the two or more nodes, while routers and memory arrays of nodes other than the two or more nodes do not receive power.

2. The memory structure of claim 1, wherein the memory array is configured to be powered off except when in use.

3. The memory structure of claim 1, wherein the memory array is a non-volatile memory array.

4. The memory structure of claim 3, wherein the memory array is one of FLASH, SRAM, MRAM, PCM, or ReRAM.

5. The memory structure of claim 1, wherein:
each router is assigned a unique range of addresses in a Network-on-Chip routing scheme, such that the unique range of addresses assigned to the router of each node corresponds to a range of memory addresses of the memory array directly connected to the router.

6. The memory structure of claim 1, wherein each memory array is accessible in parallel.

7. The memory structure of claim 1, wherein:
each node is configurable to operate at a respective frequency, a first node is configured to operate at a first frequency, and a second node is configured to operate at a second frequency that is different to the first frequency.

8. The memory structure of claim 1, wherein:
each node is configurable to operate at a respective voltage, a first node is configured to operate at a first voltage and a second node is configured to operate at a second voltage that is different to the first voltage.

9. The memory structure of claim 1, wherein:
each link of the plurality of links comprises one or more channels.

10. The memory structure of claim 9 wherein:
each channel is configurable to operate at a respective frequency, and a first router is configured to operate a first channel at a first frequency and to operate a second channel at a second frequency that is different to the first frequency.

11. The memory structure of claim 9, wherein:
one or more channels of a first router are full-duplex channels, and each of the one or more channels is capable of operating at a respective bandwidth.

12. A memory device, comprising:
a plurality of routers connected by links to form an interconnected network, each router having a unique range of network addresses; and
a plurality of memory arrays, each memory array is connected to a respective router of the plurality of routers and is powered independently of the respective router, each memory array has a sequence of memory addresses corresponding to the unique range of network addresses of the respective router, the sequences of memory addresses of the plurality of memory arrays form a global address space, wherein:
each router is configured to route packets to locations in the memory array connected to the router based on network addresses of the packets in the sequence of memory addresses of the memory array connected to the router and to route packets to other routers of the interconnected network based on addresses of packets in respective ranges of network addresses of the other routers; and
the interconnected network is configured to communicate a packet through a set of two or more routers of the plurality of routers by selectively powering each router of the set of two or more routers without powering memory arrays connected to the two or more routers, while routers other than the set of two or more routers do not receive power.

13. The memory device of claim 12, wherein each memory is formed of FLASH, SRAM, MRAM, PCM, or ReRAM.

14. The memory device of claim 12, wherein each router further comprises pairs of first-in first-out (FIFO)s, each pair of FIFOs coupled to one of a link.

15. The memory device of claim 14, wherein each router further comprises a modulator/demodulator connected with a FIFO of one of the pairs of FIFOs.

16. A memory die, comprising:
a plurality of routers connected by a plurality of links to form a router mesh structure; and
a plurality of selectively powered memory arrays, each memory array directly connected to a respective router of the plurality of routers to form an interconnected memory cell matrix, each memory array having a sequence of memory addresses in a global address space of the interconnected memory cell matrix;
wherein each router comprises:
data packet switching logic configured to route data packets to locations in the memory array connected to the router based on addresses of data packets in the sequence of memory addresses of the memory array and to route data packets to other routers of the router mesh structure based on addresses of data packets within the global address space in respective sequences of memory arrays connected to the other routers; and
an aggregator connected to the data packet switching logic;
wherein the plurality of routers are configured for sequential activation of two or more routers along a path of a data packet, while other routers of the plurality of routers not along the path do not receive power and memory arrays connected to the two or more routers do not receive power.

17. The memory die of claim 16, wherein each router further comprises:
a plurality of first-in first-out (FIFO)s, each FIFO coupled to the data packet switching logic of the router and one of a network link and an internal link of the router.

18. The memory die of claim 16, wherein the memory arrays comprise FLASH, SRAM, MRAM, PCM, or ReRAM.

19. The memory die of claim 16, wherein each memory array of the plurality of memory arrays is configured to be powered off except when in use.

20. The memory die of claim 16, wherein the plurality of routers are arranged in a grid pattern in the memory die.

* * * * *